(12) United States Patent
Griffin et al.

(10) Patent No.: US 6,847,973 B2
(45) Date of Patent: Jan. 25, 2005

(54) METHOD OF MANAGING SLOWLY CHANGING DIMENSIONS

(75) Inventors: David Antony John Griffin, Rudgwick (GB); Peter James Lawrence Griffiths, Ottowa (CA); Stephen Hugh Judges, Ottawa (CA); Nigel Anthony Campbell, Ottawa (CA); Michael David Roberts, London (GB)

(73) Assignee: Cognos Incorporated, Ottawa (CA)

( * ) Notice: Subject to any disclaimer, the term of this patent is extended or adjusted under 35 U.S.C. 154(b) by 365 days.

(21) Appl. No.: 09/883,864

(22) Filed: Jun. 18, 2001

(65) Prior Publication Data

US 2002/0038306 A1 Mar. 28, 2002

(30) Foreign Application Priority Data

Jun. 16, 2000 (CA) .............................................. 2311884

(51) Int. Cl.7 .............................................. G06F 17/30
(52) U.S. Cl. ...................................................... 707/101
(58) Field of Search .............................. 707/2, 3, 101, 707/200; 340/7.29; 379/88.17, 211.02, 220.01; 706/55; 709/201

(56) References Cited

U.S. PATENT DOCUMENTS 6,003,024 A    12/1999  Bair et al. ..................... 707/3
6,549,907 B1 *  4/2003  Fayyad et al. ............... 707/101
6,587,547 B1 *  7/2003  Zirngibl et al. ........... 379/88.17

FOREIGN PATENT DOCUMENTS

EP          1164511 A2 * 12/2001    ........... G06F/17/30

OTHER PUBLICATIONS

Ralph Kimball, "The Data Warehouse Lifecycle Toolkit", 1998, XP002243859, pp. 180–193.
Ralph Kimball, "The Data Warehouse Toolkit", 1996, XP002243860, pp. 100–106.

* cited by examiner

Primary Examiner—Diane D Mizrahi
Assistant Examiner—Apu M Mofiz
(74) Attorney, Agent, or Firm—Shumaker & Sieffert, PA

(57) ABSTRACT

A method of managing slowly changing dimensions in a dimensional database, such as a dimensional data mart, is disclosed. The method consists of providing a dimension template for each dimension undergoing slow changes, which template assigns a behavior to each column of the dimension table. When a row of dimensional data is to be delivered to the dimension table, the table is searched for a record having the key value of the row of data to be delivered. If such a record exists and if any attributes of the row to be delivered have their values changed compared with the existing record, the table is updated according to the behavior type assigned to these attributes in the dimension template, either by overwriting the existing record with the record to be delivered or by creating a new record or records.

16 Claims, 2 Drawing Sheets

METHOD OF MANAGING SLOWLY CHANGING DIMENSIONS

This application claims priority from Canadian Application No. 2,311,883, filed Jun. 16, 2000, the entire content of which is incorporated herein by reference.

FIELD OF THE INVENTION

The present invention relates to dimensional databases, and in particular to a method of managing slowly changing dimensions of a dimensional database.

BACKGROUND OF THE INVENTION

The field of business applications of computer technology has seen many important changes over the last few years. With steadily growing computational power and data storage capacities of computer systems used for business data processing, the interest of the business community has shifted from transactional data management systems (on-line transaction processing systems, or OLTP systems, mostly supporting day-to-day business operations) and from relatively simple business data processing systems towards sophisticated business management systems, such as enterprise resource planning (ERP) systems, integrating at the enterprise level all facets and functions of the business, including planning, manufacturing, sales and marketing. An example of a business management software package of this scope is SAP R/3 System available from SAP AG (Germany) or its U.S. branch, SAP America, Inc.

Among various alternative approaches to business data management and analysis developed over the last few years, many are related to data warehousing. A data warehouse can be defined broadly as a subject-oriented collection of business data identified with a particular period of time (i.e., historically-oriented), as opposed to transactional (operational) databases dedicated to managing ongoing, day-to-day business activities. A scaled-down, usually single-subject oriented warehouse is sometimes referred to as a data mart. Data in a warehouse is normally gathered from a variety of sources (mostly various OLTP and legacy systems) and merged into a coherent whole. Data in a warehouse is usually stable, in that data is added to the warehouse but not removed. The latter feature, which is normally desirable to provide a more complete image of the business over time, may be absent from warehouses designed to keep data for a predetermined time span, with the oldest data being unloaded when the newest data is added.

As opposed to data stored in OLTP systems intended to support day-to-day operations and optimized mostly for the speed and reliability of transaction processing, data stored in a data warehouse or a data mart is intended to provide higher-level, aggregated views of the data, such as total sales by product line or region over a predetermined period of time, in support of business decision making. To provide consistently fast responses to such aggregate queries, data in a data warehouse or data mart must be structured in a manner facilitating the data synthesis, analysis, and consolidation.

The most characteristic feature of warehoused business data is its multidimensional view of a business, meaning that business data is organized according to major aspects and measures of the business, called dimensions, such as its products, markets, profits, or time periods involved, by which data is analyzed to provide insights into business performance, efficiency of marketing strategies, and the like.

This dimensional business data organization is entirely different than the data dependencies model of business data, which keeps track of all logical relationships among all the possible data elements relevant to the business and its day-to-day operations. A dimension may include several hierarchical levels of categories, for example a market dimension may contain, in descending order, such categories as country, region, state, and city, each category having its own number of specific members. A hierarchical dimension reduces the total number of dimensions necessary to describe and organize the data, as compared with the situation where each category is represented by a separate dimension. The action of viewing data in greater detail by moving down the hierarchy of categories, i.e., by moving from parent to child category, is sometimes referred to as "drilling down" through the data. Quite naturally, the action of moving in the opposite direction, i.e., up the hierarchy of categories, to produce a more consolidated, higher-level view of data, is known as "drilling up" through the data.

Data organized according to the dimensional model are frequently visualized as a multidimensional data cube (or simply cube), a matrix-type structure having dimensions and their corresponding members extending along its edges. The volume of the cube is divided into cells, each cell corresponding to a combination of a specific members of each dimension and containing a metric, usually a numerical, aggregated value, corresponding to this combination of instances and providing some measure of business performance. Such a structure has an obvious geometric representation and can be easily visualized only when the number of dimensions does not exceed three (and becomes a hypercube above this limit), but the term "cube" (or "multidimensional cube") is traditionally used for any number of dimensions. A source of business data organized according to the dimensional model is sometimes referred to as an OLAP source, from On-Line Analytical Processing, a term applied broadly to class of technologies designed for dimensionally-oriented, ad hoc data representation, access, and analysis.

The vast amounts of warehoused or otherwise collected business data would be useless without software tools for its analysis. Such tools are known under the collective name of Business Intelligence (BI) applications, an example of which is a suite of BI applications from Cognos Inc. (Canada). BI applications provide, among others, data warehouse construction tools, as well as database querying, navigation and exploration tools, the latter including, among others, reporting, modeling, and visualization tools. Some of these tools combine new ways of data analysis and presentation with methods for discovering hidden patterns and previously unrecognized relationships among data, the approach known as data mining.

A data warehouse or data mart is usually structured as a relational database, which can be seen as a collection of tables organized according to the dimensional model. Central to such a dimensionally-organized relational database (dimensional database) is a table known as the fact table, storing large amounts of aggregated business measures (facts), usually derived from transactional (operational) data of a business. Each row (record) of the fact table contains at least one aggregated business measure, for example total sales of a product during a predetermined period of time, in addition to dimension keys identifying the product sold, time period during which the sales took place, geographic location of sales, and the like. In this example, characteristics like time, product and geographic location constitute business dimensions by which the data (facts) of the fact table are analyzed and the dimension keys of the fact record relate this record to relevant dimension tables. Additionally to the fact table, the dimensional database contains a number of dimension tables. A dimension table stores records of all members of a given dimension, each record (row of the dimension table) providing values of various attributes of members of the dimension, each attribute corresponding to a column of the dimension table. For example, for a client dimension, attributes may include client's key, name, address, telephone number, and the like. Examples of possible attributes of a product dimension are the product code, name, type, color, and size.

In the above model, each dimension table is related to the fact table by a single join (a star join schema), with dimensions considered to be independent. In real life applications, dimensions of a business dimensional model may not be and frequently are not independent. This is usually observed in dimensional models including a time dimension, when at least some of the remaining dimensions prove to be time-dependent, meaning that values of some attributes of certain members of such dimensions may change over time. For example, in a client dimension, addresses and/or telephone numbers of some clients may change occasionally. These changes are usually rare, meaning that a dimension undergoing such changes remains almost unchanged over time. Dimensions undergoing this kind of changes are known under the name of slowly changing dimensions. When the dimension tables of a data warehouse or data mart are updated with dimensional data extracted from transactional (operational) data, such changes are normally detected and have to be dealt with. Depending on how changes taking place in a given dimension over time are handled when updating its corresponding dimension table, three types of slowly changing dimensions, known as Type 1, Type 2, and Type 3, respectively, have been defined by Ralph Kimball and commonly accepted by the industry (see: Ralph Kimball, The Data Warehouse Toolkit: Practical Techniques for Building Dimensional Data Warehouses, John Wiley & Sons, Inc., New York 1996; Ralph Kimball et al., The Data Warehouse Lifecycle Toolkit: Expert Methods for Designing, Developing, and Deploying Data Warehouses, John Wiley & Sons, Inc., New York 1998).

The ability to deal with slowly changing dimensions is not always an integral part of software products known as ETL (Extract/Transform/Load) or ETD (Extract/Transform/Deliver) tools, which applications are used for constructing business data warehouses and data marts and for delivering transformed operational data into dimensional databases (data warehouses or data marts). The problem of slowly changing dimensions when delivering transformed data to a data mart was dealt with either manually or by writing an ad hoc piece of code particular to the star join schema at hand. DecisionStream, an ETL tool from Cognos BI suite, provides a new integrated method of dealing with slowly changing dimensions when building or updating a data mart, which method overcomes such prior art limitations.

SUMMARY OF THE INVENTION

The invention provides a new method of managing slowly changing dimensions in a dimensional database, such as a dimensional data mart. The method consists of providing a dimension template for each dimension undergoing slow changes, which template assigns a behavior to at least one attribute of the dimension. When an update record is to be delivered to a dimension table, the table is first searched for records having a primary key value identical with the key value of the record to be delivered to the table. If no such record is found in the table, the update record is added to the dimension table. If a record having the same key value and all attribute values as the update record is found in the table, the update record is rejected and no update is made to the dimension table. If a record having the same key value but at least one attribute value different from the corresponding attribute value of the update record is found in the table, the table is updated in accordance with the behavior assigned to this attribute by the dimension template. In particular, if the behavior assigned to the attribute is of Type 1, the existing record is overwritten with the update record. If the behavior assigned to the attribute is of Type 2, a new record having the new value of the attribute is created and added to the dimension table.

Thus, according to one aspect, the invention provides a method of managing a slowly changing dimension of a dimensional database, said dimensional database comprising at least one dimension table, said dimension having at least one attribute, said dimension table containing dimensional records, each record comprising values of a key and of the attributes of the dimension, said method comprising the steps of: providing a dimension template, said dimension template assigning a behavior to each attribute of the dimension; providing a dimension update record for the dimension table; adding the update record to the dimension table if no record matching the value of the key of the update record is found in the dimension table; or rejecting the update record if a record matching the value of the key and all attributes of the update record is found in the dimension table; or updating the dimension table using the values of attributes of the update record if a record matching the value of the key but not all attributes of the update record is found in the dimension table; wherein the dimension table is updated in accordance with the behavior assigned to the attributes of the dimension in the dimension template.

Other advantages, objects and features of the present invention will be readily apparent to those skilled in the art from the following detailed description of preferred embodiments, in conjunction with the accompanying drawings and claims.

BRIEF DESCRIPTION OF DRAWINGS

The invention will now be described with reference to its preferred embodiments and the accompanying drawings, in which.

DETAILED DESCRIPTION OF THE PREFERRED EMBODIMENTS

Figure 1:
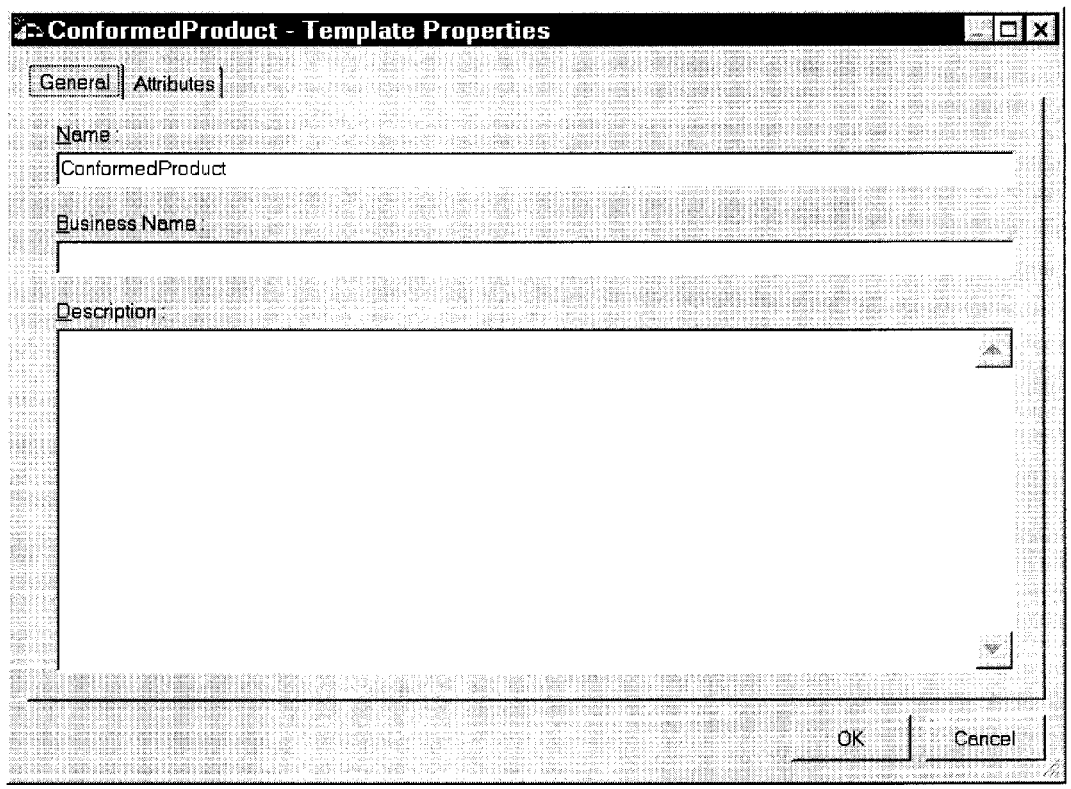
FIG. 1 is a screenshot showing the first panel of a dialog box for setting properties of a dimension template for a dimensional table according to a preferred embodiment of the invention.

In the environment of a data warehouse or data mart, information about each business dimension is stored in a dimension table. The dimension table has usually many rows, each row corresponding to one member of the dimension, and many columns, each of which corresponds to a dimension attribute. Each member of a dimension must have a business key uniquely identifying this member in streams of transactional data. Another common attribute is a business name, which name is normally substituted for the business key by an analysis software to make reports and other business data presentations more comprehensible.

For a given dimension, values of non-key attributes of certain members may be changing over time, without changing the value of the business key. For example, employees may change their department without changing their employee number (employee key), or the specification for a product may change without changing the product code (product key). Such changes are mostly irrelevant to and may remain unnoticed in an operational system, which only contains data about the current state of the business at a given point in time. For example, a sales record of an operational system may show an office in which a sales representative worked at the time when the transaction was completed. This office may be different in a later sales record showing the same representative, if he moved in the meantime to another office. Such a change is recorded by the operational system in the explained manner, but has no or little meaning within the operational system. By contrast, a data warehouse is expected to hold data for a prolonged period of time and from the point of view of analysis of such data it may be important to know all the sales offices in which the sales representative has worked and when. This means that changes taking place over time in the sales representative dimension due, for example to a sales representative moving from one sales office to another, should be somehow recorded in the corresponding dimension table when this table is being updated with dimensional data showing such changes. In other words, in the context of a data warehouse, as opposed to an operational system, it is important to identify slowly changing dimensions (SCD) and to decide which historic values should be maintained. In this context, slowly changing dimensions became synonymous with the process and techniques for managing and preserving historic values for dimensions changing over time.

As defined by Ralph Kimball, there are three typical ways of handling changes in dimensional data and the choice of method is largely dependent on the business' need to track dimensional changes. Type 1 SCDs are used when no tracking of changes taking place in a dimension over time is required and only the current values of dimension attributes are relevant for the business. It means that for Type 1 SCDs values of non-key attributes which have changed over time are overwritten with new values of these attributes. The most common reason for Type 1 changes is that there is no business reason to track such changes.

For example, a change of the marital status of a sales representative or a change of the telephone number of a client will be usually handled as Type 1 SCDs for the sales representative and the client dimension, respectively.

Type 2 SCDs are arguably the most important type of changes in the process of warehousing business data. These are changes recognized as important from the point of view of business data analysis and, when detected in the source (operational) data, they must be trackable in the data warehouse. For example, if at some date a sales representative has moved to a new office, starting from this date sales of this representative must be reported under the new sales office, but all prior sales should be reported under the previous office. At the same time all sales of the representative are credited to him, regardless of which office he worked in when the sales were made. Type 2 SCDs are handled by adding a new record (row) to the dimension table. The new record has the value of one or more attributes changed compared with the original record, which remains in the dimension table. Usually, an effective begin/end date is also added to the old and new record, to indicate when the change took place. In the above example, the new record added to the sales representative dimension table would have a new value of the office attribute and the date at which the representative moved to the new office as the effective begin date. In the updated dimension table, the still present original record would point to pre-existing sales facts, but all new sales for this sales representative would be joined to the new dimension record.

Tracking historical changes of Type 2 SCDs may require adding several records to a dimension table for the same product, employee, sales representative, and the like, originally identified by a unique business key, such as a product code, an employee number, or a representative key. As in the updated table such a business key is no longer unique, it cannot be used to uniquely identify a record in the dimension table. Distinguishing between added records would be still possible based on composite keys combining several attributes, but such keys, usually text-based, may be very long and inefficient. This problem is usually solved by uniquely identifying each record (row) of the dimension table with a numerical surrogate key. To ensure its uniqueness, such a surrogate key is preferably generated by the ETL software and has no physical meaning, as opposed to most business keys, such as a product code. Thus, when a tracked change (Type 2 SCD) is detected, a new surrogate key is generated and assigned to a new record added to the dimension table. Multiple rows of the table may have the same business key, but each will have a unique surrogate key.

In the method according to the invention, the maintenance of both SCDs and surrogate keys is automated and does not require human intervention once an initial setup is completed. In a preferred embodiment, an internally assigned surrogate key is a 4-byte integer, meaning that more than 2 billion unique surrogate keys (positive integers) can be generated and assigned. By using an internally generated and assigned surrogate key, the uniqueness of the key can be ensured. Even if for a given dimension some externally assigned unique numerical key may exist, such as a social security number, that number may be missing or incorrect when the data is entered into the system. An internally assigned surrogate key always exists and is guaranteed unique.

Even though operational databases from which data are extracted, transformed and delivered to a data mart may sometimes use surrogate keys (e.g., employee number) which can be passed into the data mart, these operational surrogate keys normally cannot and should not be used as data mart surrogate keys. For example, when merging entities from separate operational systems, each with its own operational surrogate key, it may be preferable to assign a single surrogate key to the merged entity, e.g., to uniquely identify a single customer originally identified by its checking account, savings account and insurance policy numbers, each of them being a unique operational surrogate keys. In such a case the operational surrogate keys, when transferred into the data mart, may still play the role of natural (business) keys and can be used for queries. On the other hand, a single member in a data mart, for example an employee or a product, may have several data mart surrogate keys assigned over time to deal with slowly changing dimensions.

The sheer size of data marts also makes surrogate keys preferable to natural keys. When an operational database may have millions of rows, a single fact table of a data mart may have billions of even trillions of rows. In this case the small size of surrogate keys can save large amounts of storage space.

The method of the present invention uses dimension templates as a means of managing slowly changing dimensions. A dimension template is associated with a dimension table and provides information that is required to properly maintain and use a table. Each column (attribute) of the dimension table has assigned one of the following seven behavior types:

| | |
|---|---|
| Surrogate Key | the surrogate key for the dimension |
| Business Key | the primary business key (the ID) of the dimension |
| Effective Date | the earliest date to which the dimension data row applies |
| End Date | the last date to which the dimension data row applies; the range over which the data row applies is from the Effective Date to the End Date (or the current date if there is no end date) |
| Last Update Date | the date on which the dimension data row was last updated |
| Current Indicator | a flag that indicates whether the dimension data row contains the current values for the member; these flags can be user-specified; default values are Y for 'contains current value' and N for 'does not contain current value' |
| Normal | other attributes |

Except for surrogate key and business key, each of these behavior types can be further defined as Type 2. According to a preferred embodiment, this is achieved by selecting Type 2 property in a suitable dialog box when setting up a dimension template for a dimension, as explained more in detail later in this disclosure. Specifying that a behavior type is Type 2 indicates that the attribute is 'slowly changing' and should be treated as Type 2 SCD when the dimension table is updated with dimensional data delivered to this table. By default, an attribute which is not specified as being Type 2 is considered to be Type 1 and should be treated as Type 1 SCD when the dimension table is updated.

If during an update of a dimension table a change of value in a Type 1 attribute is detected for a particular business key, the existing value of the attribute in the row associated with this business key is overwritten with the new value of the attribute and any Last Update Time attribute is overwritten with the current date.

If during an update of a dimension table a change of value in Type 2 attribute is detected for a particular business key, a new dimension data record (row) having an internally assigned surrogate key is created. For the existing data record (row) associated with this business key, any End Date attribute is set to the current time minus one second and any Current Indicator attribute is set to the value indicating 'past value'. For the newly created dimension data record, any Effective Date attribute is set to the current date and any Current Indicator attribute is set to the value indicating "current value". All the remaining attributes of the newly created dimension data row are updated with the current values.

According to a preferred embodiment, each row of a dimension table is associated with an internally assigned numerical surrogate key. This is not strictly necessary, even though recommended, for a dimension table containing only Type 1 attributes, as in this case updating the table will not create records sharing a common business key. If unique, the business key will always uniquely identify rows of such a dimension table. For a dimension table containing at least one Type 2 attribute, associating each row of the table with a unique key other than the business key is necessary, bearing in mind that the process of updating such a table may result in several rows sharing a common business key. Again, an internally assigned numerical surrogate key is preferred as a unique key.

In a preferred embodiment, the method of managing slowly changing dimensions according to the invention is embedded in an ETL application running under an operating system, preferably under the MS Windows operating system, using facilities and methodologies of the Windows environment well known to those skilled in the art, such as the point-and-click graphical user interface, as well as standard input and output devices, such as a mouse and a keyboard. In this environment, a dimension template assigning a behavior type to each column of a dimension table is created using a suitable dialog box, as shown in FIG. 1. This dialog box contains two panels, associated with "General" and "Attributes" tabs. In FIG. 1 the "General" panel is in the foreground, brought into this position by clicking at the corresponding tab. This panel contains three text fields into which general information about the template can be entered: name (name of the template, which is mandatory and may or may not be the same as the name of the dimension table associated with the template), business name (name of the business to which the dimension table pertains), and description (for description of the dimension table, template, business, etc.). The last two fields are optional.

Figure 2:
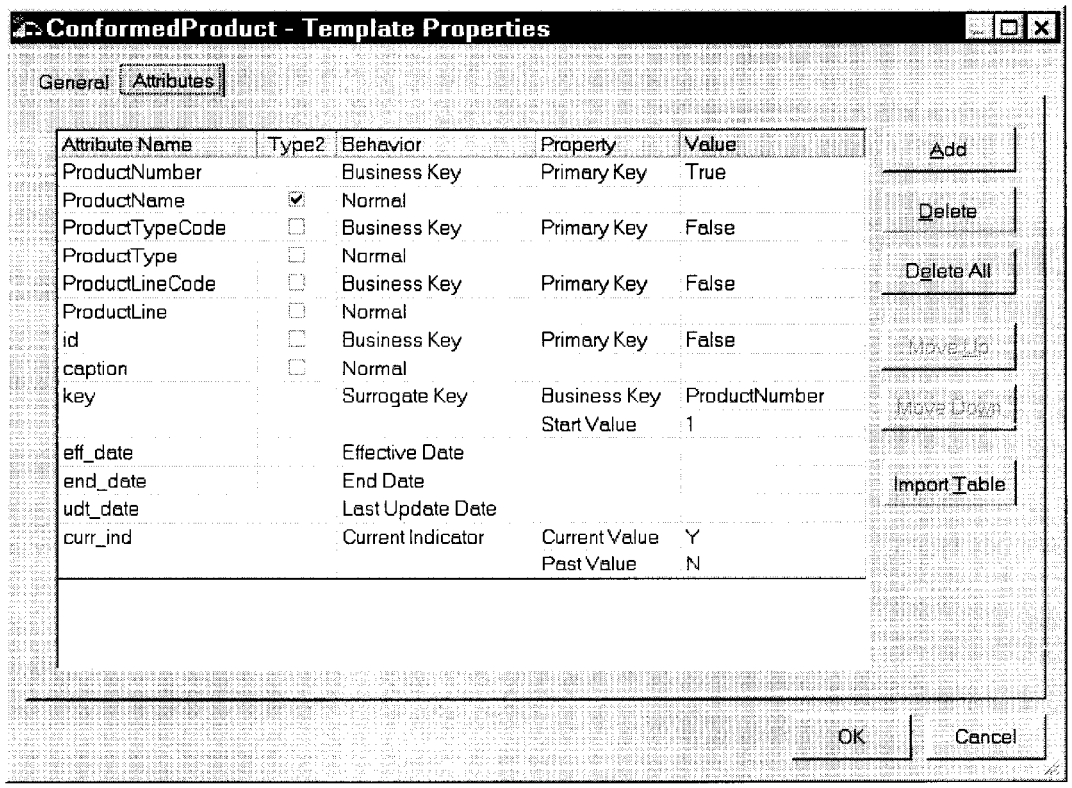
FIG. 2 is a screenshot showing the second panel of the dialog box shown in FIG. 1.

Clicking at the tab "Attributes" brings the second panel of the dialog box to the foreground, as shown in FIG. 2. This panel contains the dimension template itself, in the form of a table consisting of rows and columns. The first column, under the heading "Attribute Name", contains names of all attributes of the dimension table associated with the template. The second column, under the heading "Type 2" contain check boxes placed against all the attributes which may be designated as having Type 2 behavior. Leaving any such box unchecked indicates by default that the corresponding attribute is a Type 1 attribute. The third column, under the heading "Behavior", defines the behavior of each attribute, as discussed above. The forth and fifth column (under the headings "Property" and "Value", respectively) provide additional explanation as to the nature of some attributes and initial values which may be assigned to these attributes. The dimension template shown in FIG. 2 may be created either manually, by typing in the suitable information, or by importing an appropriate table into the dialog box. In the latter case, the attributes (columns) of the imported table will be inserted into the rows of the Attribute Name column of the template, leaving Type 2 boxes unchecked and the Behavior of all attributes set to Normal by default. Such a template may be then edited manually, to reflect the intended behavior, property, and value of each attribute.

In the following, the method of the present invention will be further explained for a simple dimensional database based on a simple star join schema, i.e., consisting of a single fact table and a number of dimension tables related to the fact table by a single join, each dimension table corresponding to a business dimension. The basic requirements for the dimension table is that it has a column for a business key, may have columns which are used to maintain the table, and may have further columns representing various attributes of the key.

EXAMPLE 1

Simple Dimension Table with Only Type 1 Behavior

In such a simple dimension table:

there must be a business key, there may be a surrogate key (recommended, not mandatory), may also be further attributes of the business key.

Three scenarios are possible when updating the table (delivering a new record to the table):

1. The key of the record to be delivered does not exist in the table. In this case, a new record identical with the record to be delivered is created in the dimension table and, if required, a new surrogate key is created for and added to this record.
2. The key of the record to be delivered does exist in the table, but values of one or more attributes of the record to be delivered have changed compared with the existing record. In this case, values of attributes of the existing record are overwritten with attribute values of the record to be delivered. No new record is created.
3. The key of record to be delivered exists in the table and no attributes of this record have changed compared with the existing record. In this case the record to be delivered is simply ignored.

When the above simple dimension table is described using a dimension template, the following information is recorded by the application:

1.
   Column: Key
   Behavior: Business Key
   Meaning: This column uniquely identifies the dimension record
2.
   Column: Surrogate key
   Behavior: Surrogate Key
   Meaning: This is a surrogate value generated in response to a new dimension record. It is linked to a business key.
3.
   Column: Attribute 1, 2, 3 . . .
   Behavior: Normal
   Meaning: These are various attributes which will be overwritten when they change. The action of overwriting makes this Type 1 behavior.

EXAMPLE 2

Slowly Changing Dimension Table

The slowly changing dimension table builds on the actions of the simple dimension table. The objective is to keep track of the values of attributes changing over time in a single table rather than just replacing old attribute values with new ones. A slowly changing dimension table according to the invention includes some additional columns which make the tracking of changing values simpler. These columns are generally concerned with tracking the behavior of the table rows. Typical columns of a dimension table tracking changes of various attributes over time are the following:

1.
   Column name: Key
   Behavior: Business Key
   Meaning: This columns identifies the dimension record, but it is not necessarily unique within the dimension table.
2.
   Column name: Surrogate key
   Behavior: Surrogate Key
   Meaning: This is a unique value generated in response to a new or changed dimension record.
3.
   Column name: Attribute 1, 2, 3 . . .
   Behavior: Normal (Type 1 attribute)
   Meaning: These are various attributes that will be overwritten when their values change. The action of overwriting makes this Type 1 behavior.
4.
   Column name: Attribute 4, 5, 6 . . .
   Behavior: Normal (Type 2 attribute)
   Meaning: These are various attributes that will cause a new dimension records to be created when their values change. The action of maintaining history makes this Type 2 behavior.
5.
   Column name: Effective date
   Behavior: Effective Date
   Meaning: This is the date on which the record was created and became effective. If there were records in the table having the same key, all these previous records become ineffective (see Terminate Date and Current Indicator).
6.
   Column name: Terminate date
   Behavior: Terminate Date
   Meaning: The date on which the record became ineffective due to the generation of a new dimension record fir the same business key. This value is NULL for a current record.
7.
   Column name: Change date
   Behavior: Change Date
   Meaning: The date on which the record last changed, when a Type 1 attribute was updated.
8.
   Column name: Current indicator
   Behavior: Current Indicator
   Meaning: A pair of values used to indicate current and past records.

In this case, the dimension template has a considerable knowledge of the meaning and character of columns in the dimension table. The knowledge of behaviors assigned to columns is used both to maintain the dimension table and to access the table data. In maintaining the dimension table, these are the current values of attributes (columns) that must be compared against new records and potentially be updated. Hence the access to current values of these columns is important and a brief summary of importance of these columns in maintaining the dimension table follows.

1.
   Behavior: Business Key
   Importance: Identifies the set of records for a dimension value Mandatory?: Yes, and only one can be further identified as PRIMARY
2.
   Behavior: Surrogate Key
   Importance: In the absence of better information, the highest surrogate key for the business key identifies the current record Mandatory?: Yes, each surrogate key is linked to a business key
3.
   Behavior: Normal, Type 1 attribute
   Importance: None
   Mandatory?: No
4.
   Behavior: Normal, Type 2 attribute
   Importance: Holds a previous value for comparison Mandatory?: No 5.
   Behavior: Effective Date
   Importance: In the absence of better information, the latest value for the effective date is the current record
   Mandatory?: No
6.
   Behavior: End Date
   Importance: A NULL value indicates that the record is current Mandatory?: No
7.
   Behavior: Last Update Date
   Importance: None
   Mandatory?: No
8.
   Behavior: Current Indicator
   Importance: The simple way to spot current records
   Mandatory?: No In operation, when updating a dimension table (delivering dimension data to a dimension table), the application searches the dimension table for the business key value of the row to be delivered. If this search indicates that the business key value exists in the dimension table, the application determines whether any attributes (Type 1 or Type 2) have changed their value and updates the existing record or creates a new record, as the case may be. If the business key value does not exist in the dimension table, a new record based on the record to be delivered is created.

While the present invention has been described in connection with what is presently considered to be the most practical and preferred embodiments, it is to be understood that the invention is not limited to the disclosed embodiments, but is intended to cover various modifications and equivalent arrangements included within the spirit and the scope of the appended claims.

Various Embodiments of the Invention have been Described.

These and other embodiments are within the scope of the following claims.

What is claimed is:

1. A method of managing a slowly changing dimension of a dimensional database, said dimensional database comprising at least one dimension table, said dimension having at least one attribute, said dimension table containing dimensional records, each record comprising values of a key and of the attributes of the dimension, said method comprising the steps of:
   a. providing a dimension template, said dimension template assigning a behavior to each attribute of the dimension;
   b. providing a dimension update record for the dimension table;
   c. adding the update record to the dimension table if no record matching the value of the key of the update record is found in the dimension table; or
   d. rejecting the update record if a record matching the value of the key and all attributes of the update record is found in the dimension table; or
   e. updating the dimension table using the values of attributes of the update record if a record matching the value of the key but not all attributes of the update record is found in the dimension table,
   wherein the dimension table is updated in accordance with the behavior assigned to the attributes of the dimension in the dimension template.

2. A method according to claim 1, wherein the behavior assigned to an attribute of the dimension is a Type 1 behavior.

3. A method according to claim 2, wherein the dimension table is updated by overwriting the attribute value of the record found in the dimension table with the attribute value of the update record.

4. A method according to claim 3, wherein the key is a business key.

5. A method according to claim 3, wherein the key is a surrogate key.

6. A method according to claim 5, wherein the surrogate key is an internally assigned numerical key.

7. A method according to claim 3, wherein the records of the dimension table further comprise attributes characterizing their update status.

8. A method according to claim 7, wherein the values of the attributes characterizing the update status of the record are updated correspondingly.

9. A method according to claim 1, wherein the behavior assigned to an attribute of the dimension is a Type 2 behavior.

10. A method according to claim 9, wherein the dimension table is updated by adding to the table a new record having the attribute value of the update record.

11. A method according to claim 10, wherein the key is a surrogate key.

12. A method according to claim 11, wherein the surrogate key is an internally assigned numerical key.

13. A method according to claim 10, wherein the records of the dimension table further comprise attribute values characterizing their update status.

14. A method according to claim 13, wherein the values of the attributes characterizing the update status of the records affected by the update are updated correspondingly.

15. An apparatus for managing a slowly changing dimension of a dimensional database, said dimensional database comprising at least one dimension table, said dimension having at least one attribute, said dimension table containing dimensional records, each record comprising values of a key and of the attributes of the dimension, said apparatus comprising:
   a. means for providing a dimension template, said dimension template assigning a behavior to each attribute of the dimension;
   b. means for providing a dimension update record for the dimension table;
   c. means for adding the update record to the dimension table if no record matching the value of the key of the update record is found in the dimension table; or
   d. means for rejecting the update record if a record matching the value of the key and all attributes of the update record is found in the dimension table; or
   e. means for updating the dimension table using the values of attributes of the update record if a record matching the value of the key but not all attributes of the update record is found in the dimension table,
   wherein the dimension table is updated in accordance with the behavior assigned to the attributes of the dimension in the dimension template.

16. Computer executable software code stored on a computer readable medium, the code for managing a slowly changing dimension of a dimensional database, said dimensional database comprising at least one dimension table, said dimension having at least one attribute, said dimension table containing dimensional records, each record comprising values of a key and of the attributes of the dimension, said code comprising:

a. code for providing a dimension template, said dimension template assigning a behavior to each attribute of the dimension;

b. code for providing a dimension update record for the dimension table;

c. code for adding the update record to the dimension table if no record matching the value of the key of the update record is found in the dimension table; or d. code for rejecting the update record if a record matching the value of the key and all attributes of the update record is found in the dimension table; or e. code for updating the dimension table using the values of attributes of the update record if a record matching the value of the key but not all attributes of the update record is found in the dimension table, wherein the dimension table is updated in accordance with the behavior assigned to the attributes of the dimension in the dimension template.

* * * * *

UNITED STATES PATENT AND TRADEMARK OFFICE
CERTIFICATE OF CORRECTION

PATENT NO.    : 6,847,973 B2
DATED         : January 25, 2005
INVENTOR(S)   : David Antony John Griffin et al.

It is certified that error appears in the above-identified patent and that said Letters Patent is hereby corrected as shown below:

Column 14,
Line 11, add claims 17-42 as follows:
-- 17.  An apparatus according to claim 15, wherein the behavior assigned to an attribute of the dimension is a Type 1 behavior.
18.  An apparatus according to claim 17, wherein the dimension table is updated by overwriting the attribute value of the record found in the dimension table with the attribute value of the update record.
19.  An apparatus according to claim 18, wherein the key is a business key.
20.  An apparatus according to claim 18, wherein the key is a surrogate key.
21.  An apparatus according to claim 20, wherein the surrogate key is an internally assigned numerical key.
22.  An apparatus according to claim 18, wherein the records of the dimension table further comprise attributes characterizing their update status.
23.  An apparatus according to claim 22, wherein the values of the attributes characterizing the update status of the record are updated correspondingly.
24.  An apparatus according to claim 15, wherein the behavior assigned to an attribute of the dimension is a Type 2 behavior.
25.  An apparatus according to claim 24, wherein the dimension table is updated by adding to the table a new record having the attribute value of the update record.
26.  An apparatus according to claim 25, wherein the key is a surrogate key.
27.  An apparatus according to claim 26, wherein the surrogate key is an internally assigned numerical key.
28.  An apparatus according to claim 25, wherein the records of the dimension table further comprise attribute values characterizing their update status.
29.  An apparatus according to claim 28, wherein the values of the attributes characterizing the update status of the records affected by the update are updated correspondingly.
30.  A code according to claim 16, wherein the behavior assigned to an attribute of the dimension is a Type 1 behavior.
31.  A code according to claim 30, wherein the dimension table is updated by overwriting the attribute value of the record found in the dimension table with the attribute value of the update record.
32.  A code according to claim 31, wherein the key is a business key.
33.  A code according to claim 31, wherein the key is a surrogate key.
34.  A code according to claim 33, wherein the surrogate key is an internally assigned numerical key.
35.  A code according to claim 31, wherein the records of the dimension table further comprise attributes characterizing their update status.
36.  A code according to claim 35, wherein the values of the attributes characterizing the update status of the record are updated correspondingly.

UNITED STATES PATENT AND TRADEMARK OFFICE
CERTIFICATE OF CORRECTION

PATENT NO. : 6,847,973 B2
DATED : January 25, 2005
INVENTOR(S) : David Antony John Griffin et al.

It is certified that error appears in the above-identified patent and that said Letters Patent is hereby corrected as shown below:

<u>Column 14 (cont'd),</u>
37.      A code according to claim 16, wherein the behavior assigned to an attribute of the dimension is a Type 2 behavior.
38.      A code according to claim 37, wherein the dimension table is updated by adding to the table a new record having the attribute value of the update record.
39.      A code according to claim 38, wherein the key is a surrogate key.
40.      A code according to claim 39, wherein the surrogate key is an internally assigned numerical key.
41.      A code according to claim 38, wherein the records of the dimension table further comprise attribute values characterizing their update status.
42.      A code according to claim 41, wherein the values of the attributes characterizing the update status of the records affected by the update are updated correspondingly. --.

Signed and Sealed this

Twenty-eighth Day of March, 2006

JON W. DUDAS
*Director of the United States Patent and Trademark Office*